United States Patent [19]
Hatton et al.

[11] Patent Number: 5,195,380
[45] Date of Patent: Mar. 23, 1993

[54] PETROLEUM STREAM ANALYZING MEANS AND METHOD

[75] Inventors: Gregory J. Hatton; Michael G. Durrett, both of Houston; Earl L. Dowty, Katy; Gary E. Collier, Houston; Clifford L. Redus, Katy; Steven M. Stockman, Alvin, all of Tex.

[73] Assignee: Texaco Inc., White Plains, N.Y.

[21] Appl. No.: 701,731

[22] Filed: May 17, 1991

[51] Int. Cl.⁵ .................. G01F 1/74; G01F 15/08
[52] U.S. Cl. ................................. 73/861.04
[58] Field of Search ..................... 73/200, 861.04

[56] References Cited

U.S. PATENT DOCUMENTS

| | | | |
|---|---|---|---|
| 4,429,581 | 2/1984 | Furmaga | 73/861.04 |
| 4,476,719 | 10/1984 | Millar et al. | 73/200 |
| 4,760,742 | 8/1988 | Hatton | 73/200 X |
| 4,773,257 | 9/1988 | Aslesen et al. | 73/861.04 X |
| 5,048,348 | 9/1991 | Durrett et al. | 73/200 X |

Primary Examiner—Herbert Goldstein
Attorney, Agent, or Firm—James J. O'Loughlin; Ronald G. Gillespie

[57] ABSTRACT

A multiphase petroleum stream pipeline analyzer including a defoaming device connected to an upstream section of the pipeline which reduces foam in the petroleum stream. Apparatus stratifies the petroleum stream after defoaming by causing the stream to flow down a decline at a predetermined angle to the horizontal. A device traps gas released during stratification and provides the gas to an accumulator. Liquid exits from the trap device and is allowed to re-enter the downstream section of the pipeline. The accumulator also accumulates gas from the defoaming operation and the stratification. The gas is allowed to exit from the accumulator to the downstream section of the pipeline so as to recombine the petroleum stream. A plurality of sensors monitor liquid and gas in the trap, and exit from the trap and the accumulator for various conditions of the liquid and the gas and provides corresponding signals. A water cut monitor provides a signal corresponding to the water cut of the liquid. A computer having data relating to characteristics of the gas, the liquid, and produced water, entered therein, provides at least one output relating to at least one of the flow rates of gas, oil and water, in accordance with the signals from the sensors and from the water cut monitor.

20 Claims, 1 Drawing Sheet

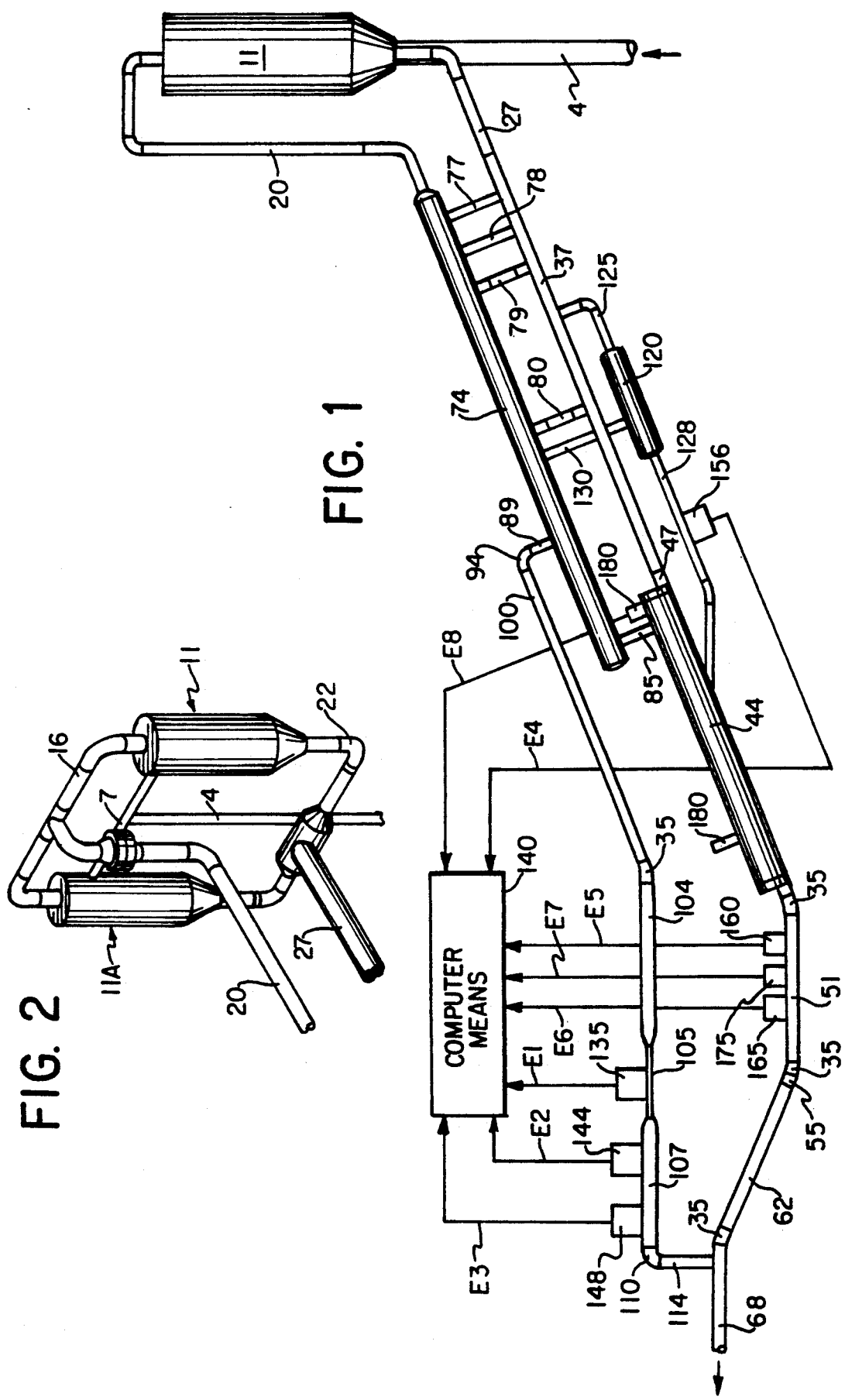

PETROLEUM STREAM ANALYZING MEANS AND METHOD

BACKGROUND OF THE INVENTION

Field of the Invention

The present invention relates to petroleum stream analyzing means and method.

SUMMARY OF THE INVENTION

A multiphase petroleum stream pipeline analyzer including a defoaming device connected to an upstream section of the pipeline which reduces foam in the petroleum stream. Apparatus stratifies the petroleum stream after defoaming by causing the stream to flow down a decline at a predetermined angle to the horizontal. A device traps gas released during stratification and provides the gas to an accumulator. Liquid exits from the trap device and is allowed to re-enter the downstream section of the pipeline. The accumulator also accumulates gas from the defoaming operation and the stratification. The gas is allowed to exit from the accumulator to the downstream section of the pipeline so as to recombine the petroleum stream. A plurality of sensors monitor liquid and gas in the trap, and exit from the trap and the accumulator for various conditions of the liquid and the gas and provides corresponding signals. A water cut monitor provides a signal corresponding to the water cut of the liquid. A computer having data relating to characteristics of the gas, the liquid, and produced water, entered therein, provides at least one output relating to at least one of the flow rates of gas, oil and water, in accordance with the signals from the sensors and from the water cut monitor.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a partial schematic and partial simplified block diagram of a multi-phase monitoring system constructed in accordance with the present invention.

FIG. 2 shows, in more detail, the arrangement of the cyclone separators shown in FIG. 1.

DESCRIPTION OF THE INVENTION

In earlier versions of petroleum stream monitors, such as shown in U.S. Pat. No. 4,760,742, foam, when present in the production petroleum stream, caused erroneous readings. The present invention provides an improved petroleum stream monitor with foam reduction. With reference to FIGS. 1 and 2, a multi-phase petroleum production stream is flowing in a sub-sea pipe 4. Petroleum stream from pipe 4 is fed into another pipe 7.

Pipe 7 divides the petroleum stream to feed cyclone separators 11 and 11A which may be of a conventional centrifugal type. Elements identified by a number with an alpha suffix are connected and operate similarly to elements having the same numeric designation without an alpha suffix. It should be noted that although two cyclone separators are shown, that if the volume flow rate warrants it, one or more cyclone separators may be used. Cyclone separators 11, 11A are used to reduce the foam to an insignificant level.

Gas is removed from cyclone separators 11, 11A by way of a line 16 and thence into a line 20. The liquid, oil and water, is removed from cyclone separators 11, 11A via a line 22 which feeds another line 27.

Line 27 is connected to a pipe 37 which is declined at a predetermined angle in a range of angles from 10° to 80° so as to provide a static head at the outlets of cyclone separators 11, 11A. It should be noted that all angles are with regards to the horizontal and can be the same but it is not necessary that the angles actually be the same. In the present example, a preferred angle of 22½° is used. Pipe 37 is connected to a 10 inch diameter pipe 44 with a suitable coupling 47. Pipe 44 functions as a gas trap and to provide a sufficient static head of liquid for the liquid to flow through a pipe 51. It should be noted that the fluid exiting pipe 44 is substantially liquid although it may include amounts of entrained gas. The end of pipe 44 is connected to a 3 inch pipe 51 through coupling 35 so that pipe 51 is in the horizontal plane. Pipe 51 is connected to another coupling 35 to a 2" diameter size coupling 55, which in turn is connected to a 4 inch pipe 62. Pipe 62 is connected to pipeline 68 by a coupling 35 where pipeline 38 is in the horizontal, but is not at the same level as the entry pipeline 38.

A gas accumulator pipe 74 is connected to pipe 37 by connecting pipes 77 through 80. As can be seen in the Figure, connecting pipes 77, 78 and 79 are relatively close together, while connecting pipe 80 is spaced further apart. A connecting pipe 45 connects pipe 44 to accumulator pipe 74 in a manner so that connecting pipe 85 is located near the upper end of pipe 44. Pipe 85 provides for liquid carried by gas through pipes 77 through 80 which has separated in pipe 74 to return to pipe 44.

Accumulator pipe 74 has a pipe 89 which is connected to a 90° elbow 64 which in turn is connected to a 4 inch pipe 100. Again, due to the 90° fitting 94 and the fact that the outlet fitting 89 is perpendicular to the longitudinal axis of pipe 74, pipe 100's longitudinal axis is substantially parallel to the axis of pipe 74 and pipes 7 and 37.

Pipe 100 is connected to another 4 inch pipe 104 by coupling 35 so that pipe 104's longitudinal axis is substantially horizontal. Pipe 104 is connected to another pipe 105 having a reduced diameter to accommodate the utilization of gas vortex meter as hereinafter explained. Pipe 105 is connected to another pipe 107 having the same diameter as pipe 104. Pipe 107 is connected to a 90° elbow 110 which in turn is connected to a pipe 114, which has entry into pipeline 68.

Another accumulator 120 receives the substantially liquid stream from pipe 37 by way of a line 125. Accumulator 120 is used to provide a liquid side stream by way of a line 128 for analysis as hereinafter explained. Line 128 carries the liquid side stream to pipe 44. A pipe 130 carries any gas released in accumulator 120 to pipe 74.

A gas flow meter 135 located by pipe 105 measures the gas flow rate and provides a corresponding signal E1 to computer means 140. Computer means 140 has a console, recording apparatus as well as a computer with a memory. A pressure transducer 144 senses the pressure of the gas in pipe 107 and provides a corresponding signal E2 to console and recording equipment 140. A temperature sensor 148 senses the temperature of the gas in pipe 107 and provides a corresponding temperature signal E3.

A microwave water cut monitor which may be of the type described and disclosed in U.S. Pat. No. 4,947,129, is shown in cooperation with line 128 to monitor the liquid side stream and to provide a corresponding water cut signal E4. A temperature sensor 160 senses the temperature of the liquid and provides a corresponding temperature signal E5. A densitometer 165 senses the density of the liquid flowing in pipe 51 and provides a corresponding liquid density signal E6. A flow rate meter 175 measures the flow rate of the liquid flowing in pipe 57 and provides a signal E7. A differential pressure transmitter 180 provides a signal E8 representative of the liquid level in pipe 44. A second element 180 is shown on pipe 44 to depict the location of the second sensing element of the differential pressure transmitter sending signal E8. Signals E1 through E8 are provided to computer means 140.

In operation, known pressure, temperature and volume (PVT) data for the petroleum liquid, gas components and produced water are stored in the internal memory of computer means 140. The amount of entrained gas in pipe 51 is determined by computer means 140 using the following equation 1.

$$Xgas = [\rho avg - [(1-Xw)\rho oil + Xw \rho w]]/[\rho gas - [(1-Xw)\rho oil + Xw \rho w]] \quad 1$$

where Xgas is the gas fraction, $\rho avg$ is the density of the fluid in pipe 51, $\rho gas$ is the density of gas entrained in liquid in pipe 51, $\rho w$ is the density of water, $\rho oil$ is the density of oil and Xw is the water cut represented by signal E4.

The following table relates signals to sensed parameters.

| Signal | Parameter |
|--------|-----------|
| E1 | Gas flow rate - Pipe 107 |
| E2 | Gas pressure |
| E3 | Gas temperature |
| E4 | Water Cut |
| E5 | Liquid temperature |
| E6 | Liquid density |
| E7 | Liquid flow rate |
| E8 | Liquid level |

The densities of the gas and oil are determined from the stored PVT data in accordance with temperature signal E5, pressure signal E2, liquid level signal E8. The density of the water is determined at the fluid temperature, using signal E5, from the stored data.

The final oil, water and gas flow rates are then determined from the following equations.

$$Qoil = Qm*(1-Xgas)*(1-Xw), \quad 2$$

$$Qw = Qm*(1-Xgas)*Xw, \text{ and} \quad 3$$

$$Qgas = Qm*Xgas + Qg-m \quad 4$$

in which Qoil is the oil flow rate, Qw is the water flow rate, Qgas is the gas flow rate, Qm is the flow rate measurement signal E7 and Qg-m is the gas flow rate measurement signal E1.

In determining Qgas flow rate, the pressure signal E2, the gas temperature signal E3, the liquid temperature signal E5 and the liquid level measurement signal E8 are used to refer the Qgas flow rate to standard conditions of 14.7 psia and 60° F.

What is claimed is:

1. An inline monitor which monitors a multiphase petroleum stream in a pipeline, having an upstream section and a downstream section, comprising:

defoaming means connected to the upstream section of the pipeline for reducing foam in the petroleum stream, stratifying means connected to the defoaming means for stratifying the petroleum stream from the defoaming means by causing the stream to flow down a decline at a predetermined angle to the horizontal, trap means connected to the stratifying means for forming a gas trap, liquid exit means connected to the trap means and to another section of the pipeline for allowing fluid to exit from the trap means to a downstream section of the pipeline, accumulator means connected to the defoaming means, to the stratifying means and to the trap means for accumulating gas from the defoaming means, the stratifying means and the trap means, gas exit means connected to the accumulator means and to the downstream section of the pipeline for allowing gas to exit from the accumulator means to the other section of the pipeline so as to recombine the petroleum stream, a plurality of sensing means connected to the trap means, to the liquid exit means and to the gas exit means for sensing various conditions of the liquid and the gas ande providing signals corresponding thereto, water cut means connected to the stratifying means and to the trap means for providing a signal corresponding to the water cut of the liquid, and means connected to the plurality of sensing means and to the water cut means and having entered therein data relating to characteristics of the gas, the liquid and produced water for providing at least one output relating to one of the flow rates of gas, oil and water.

2. A monitor as described in claim 1 in which the defoaming means includes:

at least one centrifugal separating means connected to the upstream section of the pipeline, to the accumulate means and to the stratifying means for separating gas from the foam so as to substantially reduce the amount of the foam in the petroleum stream and to provide the gas from the foam to the accumulate means and the petroleum stream having reduced foam to the stratifying means.

3. A monitor as described in claim 2 in which the plurality of sensing means includes:

gas flow rate sensing means connected to the gas exit means for sensing the flow rate of the gas and providing a gas flow rate signal, gas temperature sensing means connected to the gas exit means for sensing the temperature of the gas in the exit means and providing a corresponding gas temperature signal, liquid flow rate sensing means connected to the liquid exit means for sensing the flow rate of the liquid and providing a liquid flow rate signal corresponding thereto, and density sensing means connected to the liquid exit means for sensing the density of the liquid and providing a corresponding density signal.

4. A monitor as described in claim 3 in which the output means includes:

determining means for determining the gas fraction of the petroleum stream.
in accordance with the following equation:

$$Xgas = [\rho avg - [(1-Xw)\rho oil + Xw \rho w]]/[\rho gas - [(1-Xw)\rho oil + Xw\rho w]]$$

where $\rho avg$ is the density of the fluid leaving the trap means, $\rho oil$ is the density of oil, $\rho w$ is the density of water and $\rho gas$ is the density of gas entrained in the liquid exiting the trap means, and Xw is the water cut.

5. A monitor as described in claim 4 in which the output means includes:

means for determining an oil flow rate Qoil in accordance with the following equation:

$$Qoil = Qm*(1-Xgas)*(1-Xw)$$

where Qm is the sensed liquid flow rate.

6. A monitor as described in claim 4 in which the output means includes:

means for determining a water flow rate Qw in accordance with the following equation:

$$Qw = Qm*(1-Xgas)*Xw$$

where Qm is the sensed liquid flow rate.

7. A monitor as described in claim 4 in which the output means includes:

means for determining a gas flow rate Qgas in accordance with the following equation:

$$Qgas = Qm*Xgas + Qg-m$$

wherein Qm is the sensed gas flow rate and Qg-m is the sensed gas flow rate.

8. A monitor as described in claim 5 in which the output means includes:

means for determining a water flow rate Qw in accordance with the following equation:

$$Qw = Qm*(1-Xgas)*Xw$$

where Qm is the sensed liquid flow rate.

9. A monitor as described in claim 5 in which the output means includes:

means for determining a gas flow rate Qgas in accordance with the following equation:

$$Qgas = Qm*Xgas + Qg-m$$

wherein Qm is the sensed gas flow rate and Qg-m is the sensed gas flow rate.

10. A monitor as described in claim 8 in which the output means includes:

means for determining a gas flow rate Qgas in accordance with the following equation:

$$Qgas = Qm*Xgas + Qg-m$$

wherein Qm is the sensed gas flow rate and Qg-m is the sensed gas flow rate.

11. A method for monitoring a petroleum stream in a pipeline, having an upstream section and a downstream section, comprising the steps of:

using defoaming means connected to the upstream section of the pipeline to reduce foam in the petroleum stream, using stratifying means to cause the petroleum stream from the defoaming means to flow down a decline at a predetermined angle to the horizontal so as to stratify the petroleum stream, trapping gas from the stratifying step with gas trap means, allowing liquid to exit from the gas trap means to the downstream section of the pipeline, accumulating gas from the defoaming means, the stratifying means and the trap means in an accumulator means, allowing gas to exit from the accumulator means to the downstream section of the pipeline so as to recombine the petroleum stream, sensing various conditions of the liquid and the gas, with a plurality of sensing means, providing signals corresponding to the sensed conditions, providing a signal corresponding to the water cut of the liquid, and providing at least one output relating to one of the flow rates of gas, oil and water in accordance with the signals from the plurality of sensing means and the water cut signal.

12. A method as described in claim 11 in which the defoaming step includes:

separating gas from the foam with at least one centrifugal separating means connected to the upstream section of the pipeline so as to substantially reduce the amount of the foam in the petroleum stream, providing the gas from the foam to the accumulate means, providing the petroleum stream having reduced foam to the stratifying means.

13. A method as described in claim 12 in which the sensing step includes:

sensing the flow rate of the gas exiting the gas trap means, providing a gas flow rate signal in accordance with the sensed gas flow rate, sensing the temperature of the gas exiting the gas trap means, providing a gas temperature signal corresponding to the sensed gas temperature, sensing the flow rate of the liquid exiting the accumulator means, providing a liquid flow rate signal corresponding to the sensed liquid flow rate, sensing the density of the liquid exiting the accumulator means, and providing a density signal corresponding to the sensed liquid density.

14. A method as described in claim 13 in which the output includes:

determining the gas fraction Xgas of the petroleum stream in accordance with the following equation:

$$Xgas = [\rho avg - [(1-Xw)\rho oil + Xw \rho w]]/[\rho gas - [(1-Xw)\rho oil + Xw \rho w]]$$

where $\rho avg$ is the density of the fluid leaving the trap means, $\rho oil$ is the density of oil, $\rho w$ is the density of water and ρgas is the density of gas entrained in the liquid exiting the trap means, and Xw is the water cut.

15. A method as described in claim 14 in which the output means includes:
   determining an oil flow rate Qoil in accordance with the following equation:

$$Qoil = Qm * (1 - Xgas) * (1 - Xw)$$

where Qm is the sensed liquid flow rate.

16. A method as described in claim 14 in which the output step includes:
   determining a water flow rate Qw in accordance with the following equation:

$$Qw = Qm * (1 - Xgas) * Xw$$

where Qm is the sensed liquid flow rate.

17. A monitor as described in claim 14 in which the output step includes:
   determining a gas flow rate Qgas in accordance with the following equation:

$$Qgas = Qm * Xgas + Qg - m$$

wherein Qm is the sensed gas flow rate and Qg-m is the sensed gas flow rate.

18. A method as described in claim 15 in which the output step includes:
   determining a water flow rate Qw in accordance with the following equation:

$$Qw = Qm * (1 - Xgas) * Xw$$

where Qm is the sensed liquid flow rate.

19. A monitor as described in claim 15 in which the output means includes:
   means for determining a gas flow rate Qgas in accordance with the following equation:

$$Qgas = Qm * Xgas + Qg - m$$

wherein Qm is the sensed gas flow rate and Qg-m is the sensed gas flow rate.

20. A method as described in claim 15 in which the output step includes:
   determining a gas flow rate Qgas in accordance with the following equation:

$$Qgas = Qm * Xgas + Qg - m$$

wherein Qm is the sensed gas flow rate and Qg-m is the sensed gas flow rate.

* * * * *